US011804916B2

(12) United States Patent
Maor et al.

(10) Patent No.: US 11,804,916 B2
(45) Date of Patent: Oct. 31, 2023

(54) SYSTEM AND METHOD FOR DETERMINING A DIRECTION OF ARRIVAL OF A RADIO SIGNAL BEING EMITTED BY A RADIO EMITTER AND A GEOLOCATION OF THE RADIO EMITTER USING A SINGLE ANTENNA

(71) Applicant: Elbit Systems EW and Sigint—Elisra Ltd., Holon (IL)

(72) Inventors: Amnon Menashe Maor, Holon (IL); Nimrod Shoshany, Holon (IL)

(73) Assignee: Elbit Systems EW and Sigint - Elisra Ltd., Holon (IL)

( * ) Notice: Subject to any disclaimer, the term of this patent is extended or adjusted under 35 U.S.C. 154(b) by 0 days.

(21) Appl. No.: 18/303,889

(22) Filed: Apr. 20, 2023

(65) Prior Publication Data

US 2023/0261767 A1 Aug. 17, 2023

Related U.S. Application Data

(63) Continuation of application No. PCT/IL2021/051247, filed on Oct. 21, 2021.

(30) Foreign Application Priority Data

Oct. 21, 2020 (IL) .......................................... 278232

(51) Int. Cl.
*H04B 17/27* (2015.01)
*H04B 17/21* (2015.01)
*H04B 17/20* (2015.01)

(52) U.S. Cl.
CPC ............. *H04B 17/27* (2015.01); *H04B 17/21* (2015.01); *H04B 17/253* (2023.05)

(58) Field of Classification Search
USPC ....................................................... 455/456.1
See application file for complete search history.

(56) References Cited

U.S. PATENT DOCUMENTS 5,502,450 A 3/1996 Zablotney et al.
5,510,795 A 4/1996 Koelle et al.
(Continued)

FOREIGN PATENT DOCUMENTS

| IL | 222095 | 3/2014 |
| JP | 2016205843 | 12/2016 |
| RU | 2596018 | 8/2016 |

OTHER PUBLICATIONS

International Search Report and Written Opinion for PCT Application No. PCT/IL2021/051247, dated Jan. 19, 2022.

*Primary Examiner* — Don N Vo
(74) *Attorney, Agent, or Firm* — PEARL COHEN ZEDEK LATZER BARATZ LLP (57) ABSTRACT

A system for determining a direction of arrival of a radio signal being emitted by a radio emitter, the system including: a single antenna configured to be moved through multiple spatial positions and configured to receive the radio signal at two or more of the multiple spatial positions; and a controller configured to determine one or more directions of arrival of the radio signal based on: a radio signal frequency; at least one residual phase difference value between at least two of two or more residual phase values each obtained based on the radio signal received by the single antenna at one of the two or more multiple spatial positions; and at least a portion of a motion data indicative of the movement of the single antenna.

20 Claims, 7 Drawing Sheets

(56) References Cited

U.S. PATENT DOCUMENTS

| | | | |
|---|---|---|---|
| 2004/0246191 | A1 | 12/2004 | Melconian et al. |
| 2005/0179579 | A1* | 8/2005 | Pinder .................. G01S 7/2926 342/25 R |
| 2006/0286931 | A1 | 12/2006 | Hyland et al. |
| 2015/0268325 | A1 | 9/2015 | Hwang et al. |
| 2016/0135007 | A1 | 5/2016 | Nord et al. |
| 2016/0370450 | A1 | 12/2016 | Thorn et al. |
| 2018/0017390 | A1 | 1/2018 | Tu et al. |
| 2018/0017661 | A1 | 1/2018 | Morioka |
| 2018/0203094 | A1 | 7/2018 | Gudim et al. |
| 2018/0217222 | A1 | 8/2018 | Feineman |
| 2019/0317177 | A1* | 10/2019 | Ertan ..................... G01S 13/75 |
| 2021/0314867 | A1* | 10/2021 | Abou-Rizk ....... H04W 52/0222 |

\* cited by examiner

SYSTEM AND METHOD FOR DETERMINING A DIRECTION OF ARRIVAL OF A RADIO SIGNAL BEING EMITTED BY A RADIO EMITTER AND A GEOLOCATION OF THE RADIO EMITTER USING A SINGLE ANTENNA

CROSS REFERENCE TO RELATED APPLICATIONS

This Application is a continuation of PCT Application No. PCT/IL2021/051247 filed on Oct. 21, 2021, which claims the priority of Israeli Patent Application No. 278232 filed on Oct. 21, 2020, both of which are incorporated herein by reference in their entireties.

FIELD OF THE INVENTION

The present invention relates to the field of interferometers, and more particularly, to device and method for determining a direction of arrival of a radio signal being emitted by a radio emitter and a geolocation of the radio emitter using a single antenna.

BACKGROUND OF THE INVENTION

Current techniques used to determine a direction of arrival of a radio signal typically include determining a phase difference of a radio signal received by at least two antennas. For example, a difference in a phase of the radio signal received by one antenna relative to the radio signal received by another antenna may be determined and the direction of arrival of the radio signal may be determined based on the difference in phase and a known distance between the antennas. However, such techniques require bulky and complex interferometer antenna arrays, for example especially for signals having large wavelength such as high frequency (HF) signals, ultra-high frequency (UHF) signals, very high frequencies (VHF) signals.

SUMMARY OF THE INVENTION

Some embodiments of the present invention provide a method of determining a direction of arrival of a radio signal being emitted by a radio emitter, the method may include: moving a single antenna through multiple spatial positions; generating a motion data indicative of the movement of the single antenna; receiving, by the single antenna, the radio signal at two or more of the multiple spatial positions; determining two or more residual phase values, each based on the radio signal received by the single antenna at one of the two or more spatial positions and based on a radio signal frequency; determining at least one residual phase difference value between at least two of the two or more determined residual phase values; and determining, based on the at least one residual phase difference value and at least a portion of the motion data, one or more directions of arrival of the radio signal.

In some embodiments, the method may include determining a geolocation of the radio emitter based on one of: at least one of the one or more determined directions of arrival of the radio signal and a geolocation of at least one of the two or more spatial positions; and three or more determined directions of arrival of the radio signal.

In some embodiments, the method may include generating the motion data using a motion sensing unit connected to the single antenna, the motion sensing unit may include at least one of: one or more inertial sensors, one or more accelerometers, one or more gyros, one or more compasses, one or more geolocation sensors and one or more optical sensors.

In some embodiments, the method may include detecting that the single antenna is substantially stationary based on two or more image frames obtained by the one or more optical sensors of the motion sensing unit; and further may include at least one of: determining the radio signal frequency based on the radio signal received by the substantially stationary single antenna; and calibrating at least one component of the motion sensing unit when the single antenna and the motion sensing unit connected thereto are substantially stationary.

In some embodiments, the radio signal is a modulated radio signal and the method may include: converting the modulated radio signal received by the single antenna to a demodulated coherent signal; and determining the two or more residual phase based on the demodulated coherent signal.

In some embodiments, the converting may include: generating a synthetic signal having the radio signal frequency; determining an added phase value based on the modulated radio signal and the synthetic signal; and determining the coherent demodulated signal based on the modulated radio signal, the synthetic signal and the added phase value.

In some embodiments, the radio signal is a modulated radio signal and the method may include passing the modulated radio signal received by the single antenna through a finite impulse response (FIR) filter to determine a residual phase value of the received modulated radio signal.

In some embodiments, the method may include determining coefficients of the FIR filer based on samples recovered from known repetitive data and waveform parameters of the received modulated radio signal.

In some embodiments, the method may include: selecting one or more pairs of spatial positions of the two or more spatial positions at which the single antenna has received the radio signal, each of the one or more pairs has a first spatial position and a second spatial position; for each of the one or more pairs: determining, based on the motion data, a distance between the first spatial position and the second spatial position of the respective pair; determining a first residual phase value based on the radio signal frequency and based on the radio signal received by the single antenna at the first spatial position of the respective pair; determining a second residual phase value based the radio signal frequency and based on the radio signal received by the single antenna at the second spatial position of the respective pair; and determining the direction of arrival of the radio signal based on the determined distance between the first spatial position and the second spatial position, the first residual phase value and the second residual phase value.

In some embodiments, the method may include selecting the one or more pairs such that the first spatial position and the second spatial position of each of the one or more pairs are subsequent spatial positions of the multiple spatial position through which the single antenna has been moved.

In some embodiments, the method may include determining one or more sets of possible directions of arrival of the radio signal, each of the one or more sets is for a pair of the one or more selected pairs of spatial positions for which the distance between the first spatial position and the second spatial position of the respective pair is greater than half of a wavelength of the radio signal.

In some embodiments, the method may include determining a most probable direction of arrival of the radio signal based on the sets of possible directions of arrival thereof and based on one of: a largest number of occurrences of each of the possible directions of arrival in the one or more sets; and a number of occurrences of each of the possible directions of arrival in the one or more sets that exceeds a predetermined threshold.

In some embodiments, the method may include: moving a first antenna through a first set of multiple spatial positions and receiving, by the first antenna, the radio signal at two or more of the multiple spatial positions of the first set; moving a second antenna through a second set of multiple spatial positions and receiving, by the second antenna, the radio signal at two or more of the multiple spatial positions of the second set; determining the one or more directions of arrival of the radio signal based on the radio signal being received by the first antenna and the second antenna.

Some embodiments of the present invention provide a system for determining a direction of arrival of a radio signal being emitted by a radio emitter, the system may include: a single antenna configured to be moved through multiple spatial positions and configured to receive the radio signal at two or more of the multiple spatial positions; and a controller configured to determine one or more directions of arrival of the radio signal based on: a radio signal frequency; at least one residual phase difference value between at least two of two or more residual phase values each obtained based on the radio signal received by the single antenna at one of the two or more multiple spatial positions; and at least a portion of a motion data indicative of the movement of the single antenna.

In some embodiments, controller is configured to determine the two or more residual phase values.

In some embodiments, the system may include a homodyne receiver down converter configured to determine the two or more residual phase values and to provide the two or more residual phase values to the controller.

In some embodiments, the controller is configured to determine a geolocation of the radio emitter based on one of: at least one of the one or more determined directions of arrival of the radio signal and a geolocation of at least one of the two or more spatial positions; and three or more determined directions of arrival of the radio signal.

In some embodiments, the system may include a motion sensing unit connected to the single antenna, the motion sensing unit may include at least one of: one or more inertial sensors, one or more accelerometers, one or more gyros, one or more compasses, one or more geolocation sensors and one or more optical sensors.

In some embodiments, the controller is configured to detect that the single antenna is substantially stationary based on two or more image frames obtained by the one or more optical sensors of the motion sensing unit; and is further configured to at least one of: determine the radio signal frequency based on the radio signal received by the substantially stationary single antenna; and calibrate at least one component of the motion sensing unit when the single antenna and the motion sensing unit connected thereto are substantially stationary.

In some embodiments, the radio signal is a modulated radio signal and the controller is configured to: convert the modulated radio signal received by the single antenna to a demodulated coherent signal; and determine the two or more residual phase values and the direction of arrival of the radio signal based on the demodulated coherent signal.

In some embodiments, the controller is configured to convert the modulated radio signal received by the single antenna to the demodulated coherent signal by: generating a synthetic signal having the radio signal frequency; determining an added phase value based on the modulated radio signal and the synthetic signal; and determining the coherent demodulated signal based on the modulated radio signal, the synthetic signal and the added phase value.

In some embodiments, the radio signal is a modulated radio signal and the controller is configured to pass the modulated radio signal received by the single antenna through a finite impulse response (FIR) filter to determine a residual phase value of the received modulated radio signal.

In some embodiments, the controller is configured to determine coefficients of the FIR filer based on samples recovered from known repetitive data and waveform parameters of the received modulated radio signal.

In some embodiments, the controller is configured to: select one or more pairs of spatial positions of the two or more spatial positions at which the single antenna has received the radio signal, each of the one or more pairs has a first spatial position and a second spatial position; for each of the one or more pairs: determine, based on the motion data, a distance between the first spatial position and the second spatial position of the respective pair; obtain a first residual phase value based on the radio signal frequency and the radio signal received by the single antenna at the first spatial position of the respective pair; obtain a second residual phase value based the radio signal frequency and the radio signal received by the single antenna at the second spatial position of the respective pair; and determine the direction of arrival of the radio signal based on the determined distance between the first spatial position and the second spatial position, the first residual phase value and the second residual phase value.

In some embodiments, the controller is configured to select the one or more pairs such that the first spatial position and the second spatial position of each of the one or more pairs are subsequent spatial positions of the multiple spatial position through which the single antenna has been moved.

In some embodiments, the controller is configured to determine one or more sets of possible directions of arrival of the radio signal, each of the one or more sets is for a pair of the one or more selected pairs of spatial positions for which the distance between the first spatial position and the second spatial position of the respective pair is greater than half of a wavelength of the radio signal.

In some embodiments, the controller is configured to determine a most probable direction of arrival of the radio signal based on the sets of possible directions of arrival thereof and based on one of: a largest number of occurrences of each of the possible directions of arrival in the one or more sets; and a number of occurrences of each of the possible directions of arrival in the one or more sets that exceeds a predetermined threshold.

In some embodiments, the system may include: a first antenna configured to be moved through a first set of multiple spatial positions and configured to receive, by the first antenna, the radio signal at two or more of the multiple spatial positions of the first set; a second antenna configured to be moved through a second set of multiple spatial positions and configured to receive, by the second antenna, the radio signal at two or more of the multiple spatial positions of the second set; and wherein the controller is configured to determine the one or more directions of arrival of the radio signal based on the radio signal being received by the first antenna and the second antenna.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Some embodiments of the present invention may provide a system for determining at least one of a direction of arrival of a radio signal being emitted by a radio emitter and a geolocation of the radio emitter.

The system may include a single antenna configured to be moved through multiple spatial positions and configured to receive the radio signal being emitted by the radio emitter at two or more of the multiple spatial positions. In some embodiments, the single antenna may be hand-held and may be manually moved by a user through the multiple spatial positions. In some embodiments, the singe antenna may be mounted on a platform (e.g., such as drone) that may be configured to move the single antenna through the multiple spatial positions.

The system may include a controller configured to determine one or more directions of arrival of the radio signal based on: a radio signal frequency; at least one residual phase difference value between at least two of two or more residual phase values each obtained based on the radio signal received by the single antenna at one of the two or more multiple spatial positions; and at least a portion of a motion data indicative of the movement of the single antenna. In some embodiments, the controller may be configured to determine a geolocation of the radio emitter.

In some embodiments, the controller is configured to determine the two or more residual phase values. In some embodiments, the system may include a homodyne receiver down converter configured to determine the two or more residual phase values and to provide the two or more residual phase values to the controller.

In some embodiments, the system may include a motion sensing unit connected to the single antenna and configured to generate motion data. In some embodiments, the motion sensing unit may include at least one of: one or more inertial sensors, one or more accelerometers, one or more gyros, one or more compasses, one or more geolocation sensors and one or more optical sensors.

The disclosed system and method may provide a synthetic array of antennas based on the single antenna movable between multiple spatial positions and a motion data from the motion sensing unit. The system may be compact. For example, the system may be wearable by the user and/or installed on small platforms such as drones. The system may be capable of determining the direction of arrival of the radio signals in a wide range of radio signal frequencies (e.g., signals within the entire radiofrequency spectrum including signals having large wavelength such as high frequency (HF) signals, ultra-high frequency (UHF) signals, very high frequencies (VHF) signals) while eliminating a need in complex and bulky antennas interferometer arrays. The system may be capable of determining the direction of arrival of the radio signals based on a single receiver channel, e.g., with small profile installation.

Figure 1A:
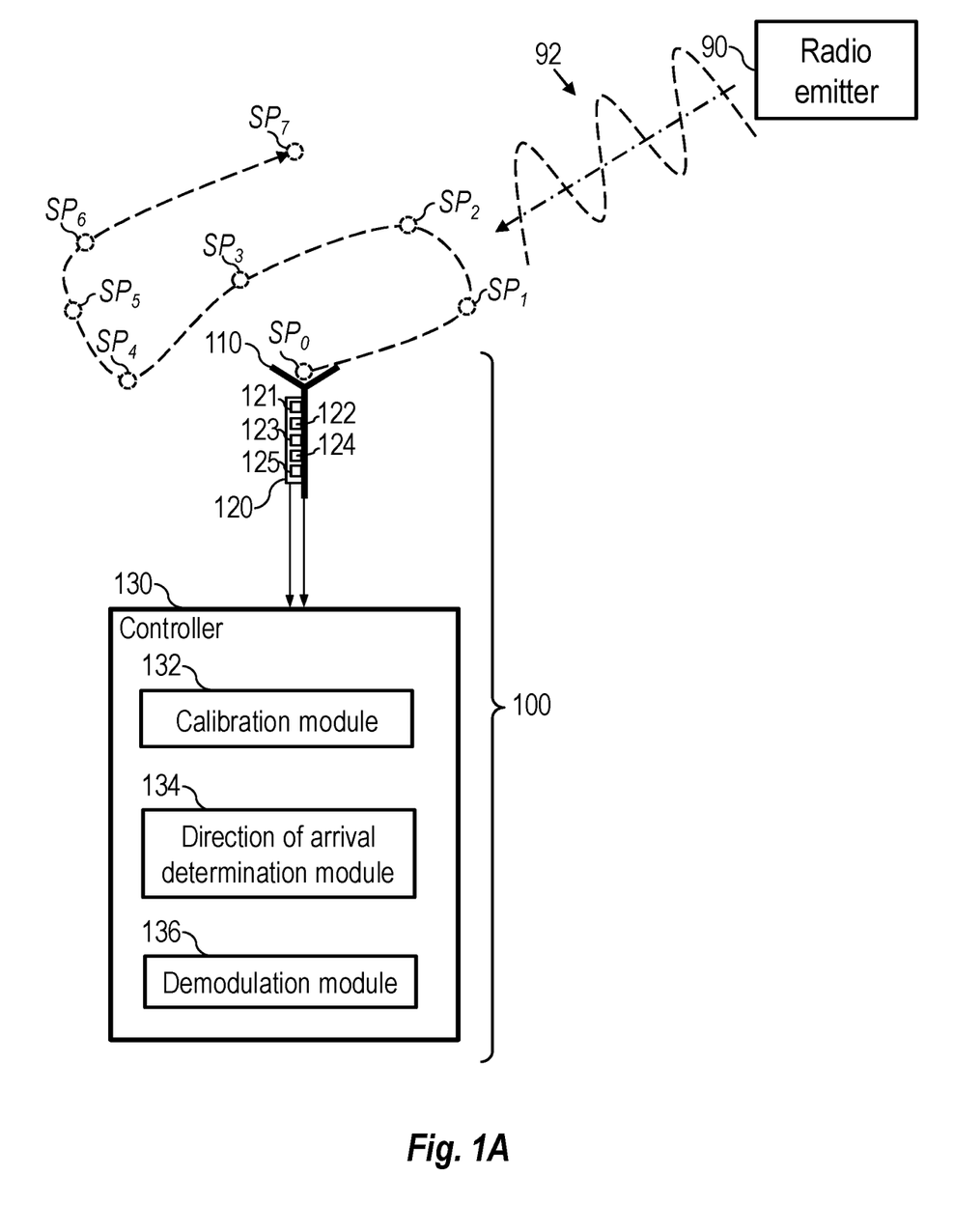
FIGS. 1A and 1B are schematic block diagrams of a system for determining a direction of arrival of a radio signal being emitted by a radio emitter and/or a geolocation of radio emitter, according to some embodiments of the invention.
Figure 1B:
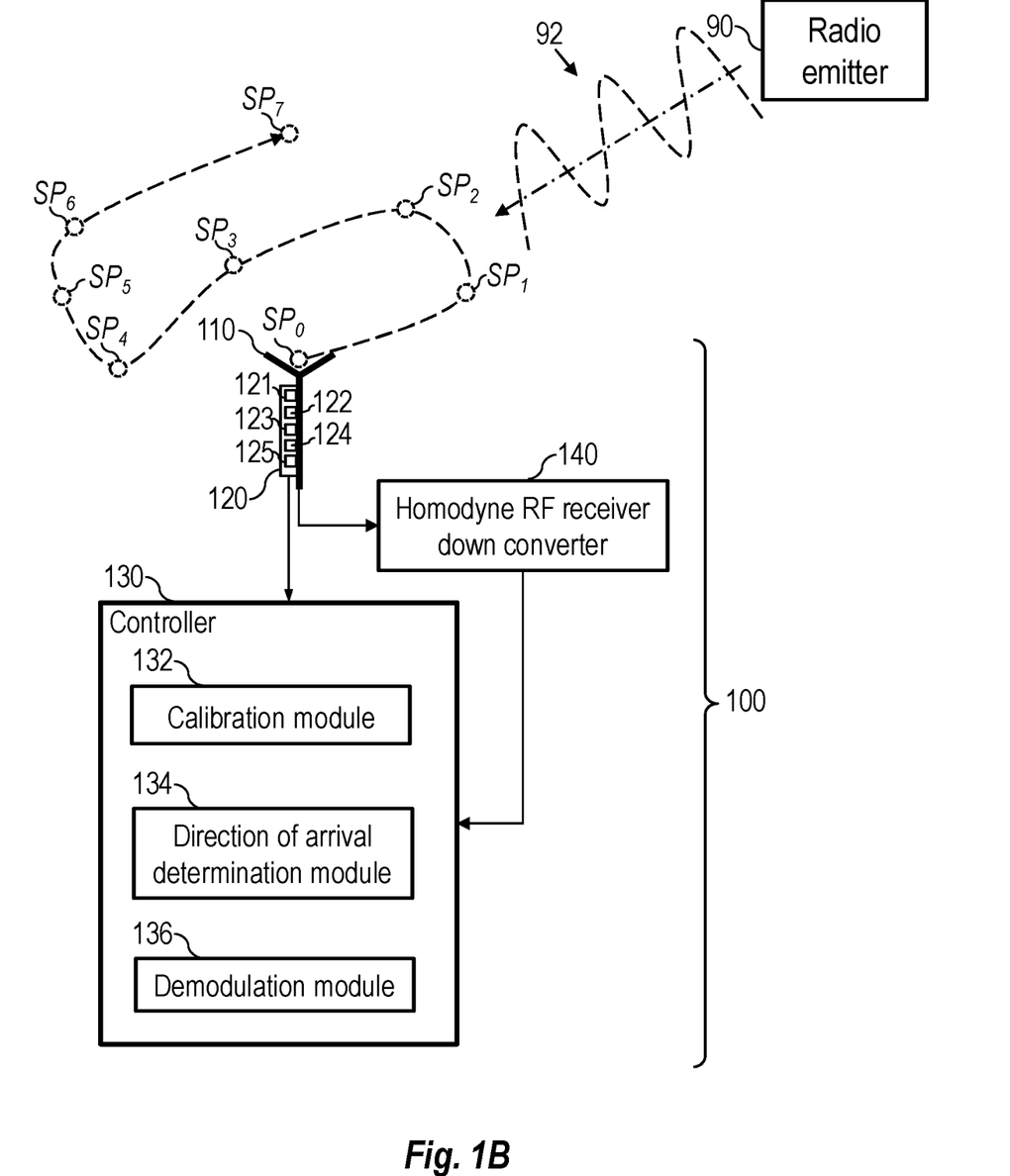

Reference is now made to FIGS. 1A and 1B, which are schematic block diagrams of a system 100 for determining a direction of arrival of a radio signal 92 being emitted by a radio emitter 90 and/or a geolocation of radio emitter 90, according to some embodiments of the invention.

According to some embodiments, system 100 may include a single antenna 110. Single antenna 110 may be configured to be moved through multiple spatial positions (e.g., such as multiple spatial positions $SP_0 \ldots SP_7$ schematically shown in FIG. 1A). In some embodiments, single antenna 110 may be hand-held and may be manually moved by a user. For example, the user may shake single antenna 110 to move single antenna 110 through the multiple spatial positions. In some embodiments, single antenna 110 may be configured to be installed on a platform, wherein the platform may be configured to move single antenna 110. For example, single antenna 110 channel may be installed on a drone.

In some embodiments, the multiple spatial positions may be arbitrary positions. For example, the user may hold single antenna 110 and randomly move/shake single antenna 110 while directing single antenna 110 towards a region of interest.

In some embodiments, single antenna 110 may be moved in a predefined manner such that the multiple spatial positions are disposed along a predefined virtual route. For example, the platform (e.g., the drone) may be configured to move single antenna 110 along the predefined virtual route. In some embodiments, the virtual route may be predefined to provide a route that is optimal for the direction of arrival determination. One example of the predefined route may include a circular route. It is noted that other routes may be used.

Single antenna 110 may be moved through the multiple spatial positions and may receive a radio signal 92 being emitted by a radio emitter 90 at two or more of the multiple spatial positions.

According to some embodiments, system 100 may include a motion sensing unit 120. Motion sensing unit 120 may be, for example, connected to single antenna 110. Motion sensing unit 120 may generate motion data indicative of the movement of single antenna 110. In some embodiments, motion sensing unit 120 may include one or more inertial sensors. In some embodiments, motion sensing unit 120 may include one or more accelerometers 121 (e.g., three-axis accelerometers). In some embodiments, motion sensing unit 120 may include one or more gyros 122 (e.g., three-axis gyros). In some embodiments, motion sensing unit 120 may include one or more compasses 123. In some embodiments, motion sensing unit 120 may include one or more geolocation sensors 124. In some embodiments, motion sensing unit 120 may include one or more optical sensors 125 (e.g., such as one or more cameras).

In some embodiments, system 100 may include a tracking unit that is not connected to single antenna 110. The tracking unit may track the movement of single antenna 110 and generate at least a portion of the motion data. Such tracking unit may, for example, include one or more optical sensor. In various embodiments, the tracking unit may be used instead or in addition to motion sensing unit 120.

According to some embodiments, system 100 may include a controller 130. In some embodiments, controller 130 may include a calibration module 132. Calibration module 132 may determine a radio signal frequency of a radio signal 92 being emitted by a radio emitter 90 and/or may calibrate at least some components of motion sensing unit 120. In some embodiments, the radio signal frequency may be known (e.g., thus eliminating a need in determination thereof).

In some embodiments, calibration module 132 may detect that single antenna 110 is stationary (or substantially stationary). Calibration module 132 may determine the radio signal frequency based on radio signal 92 received by stationary (or substantially stationary) single antenna 110. Calibration module 132 may calibrate at least some components of motion sensing unit 120 (e.g., accelerometer(s) 121, gyro(s) 122, etc.) when single antenna 110 and motion sensing unit 120 attached thereto are stationary (or substantially stationary).

In some embodiments, calibration module 132 may detect that single antenna 110 is stationary (or substantially stationary) based on two or more image frames obtained by optical sensor(s) 125 of motion sensing unit 120 attached to single antenna 110. For example, optical sensor(s) 125 may obtain two or more image frames (e.g., containing images of a surrounding environment) and calibration module 132 may determine that single antenna 110 is stationary (or substantially stationary) based on the two or more image frames thereof. For example, calibration module 132 may compare at least some of the two or more image frames and determine that single antenna 110 is stationary (or substantially stationary) if differences between at least a portion of subsequent image frames of the two or more image frames is below a specified threshold.

The determination of the radio signal frequency and/or the calibration of at least some components of motion sensing unit 120 may be performed, for example, prior to actual using of system 100. For example, when single antenna 110 is at an initial spatial position $SP_0$, the user of system 100 may initiate the radio signal frequency determination and/or the motion sensing unit 120 calibration. The radio signal frequency determination and/or the motion sensing unit 120 calibration may be repeated one or more times during the actual use of system 100 (e.g., each time or at least some of times when calibration module 132 detects that single antenna 110 is stationary).

In some embodiments, controller 130 may include a direction of arrival determination module 134.

In some embodiments, direction of arrival determination module 134 may determine two or more residual phase values, each based on radio signal 92 received by single antenna 110 at one of the two or more multiple spatial positions and based on the radio signal frequency.

For example, the radio signal frequency $w_{92}$ and the radio signal phase $\phi_0$ of radio signal 92 may be determined at, e.g., time point $t_0$, when single antenna 110 is at, e.g., initial spatial position $SP_0$, and a phase of radio signal 92 may be provided by Equation 1:

$$\phi_{SP_0}(t) = w_{92}t + \phi_0 \qquad \text{(Equation 1)}$$

When single antenna 110 is moved to another spatial position of the multiple spatial position, e.g., to a first spatial position $SP_1$, a phase of radio signal 92 at time point $t_1$ may be provided as $\phi_{SP_1}(t_1)$ and a residual phase value of radio signal 92 at that spatial position, $\phi_{res,SP_1}(t_1)$, may be provided by Equation 2:

$$\phi_{res,SP_1}(t_1)=)=\phi_{SP_0}(t_1)-\phi_{SP_1}(t_1) \qquad \text{(Equation 2)}$$

Equation 2 may, for example, resemble an interferometric equation between single antenna 110 in first spatial position $SP_1$ and a virtual single antenna 110 in spatial position $SP_0$.

In some embodiments (e.g., in embodiments shown in FIG. 1B), system 100 may include a homodyne receiver down converter 140. Homodyne receiver down converter 140 may be tuned to the radio signal frequency. Homodyne receiver down converter 140 may receive as an input radio signal 92 received by single antenna 110 at the two or more multiple spatial positions, determine the respective two or more residual phase values and output the respective two or more residual phase values to direction of arrival determination module 134. In some embodiments (e.g., in embodiments shown in FIG. 1B), direction of arrival determination module 134 may receive the two or more residual phase values from homodyne RF receiver down converter 140 (e.g., instead of determining the two or more residual phase values thereof).

Direction of arrival determination module 134 may determine at least one residual phase difference value between at least two of the two or more determined residual phase values. Each of the two or more determined residual phase values may be determined based on radio signal 92 received by single antenna 110 at one of the two or more multiple spatial positions.

Direction of arrival determination module 134 may determine one or more directions of arrival (e.g., azimuth and elevation) of radio signal 92 being emitted by radio emitter 90 based on the at least one residual phase difference value and based on at least a portion of the motion data (e.g., from motion sensing unit 120).

In some embodiments, direction of arrival determination module 134 may select one or more pairs of spatial positions of the two or more spatial position at which single antenna 110 has received radio signal 92, each of the one or more pairs having a first spatial position and a second spatial position.

For each of the pairs, direction of arrival determination module 134 may determine a distance (e.g., three-dimensional (3D) distance) between the first spatial position and the second spatial position of the respective pair based on the motion data. For example, direction of arrival determination module 134 may determine the 3D distance between the first spatial position and the second spatial position of the respective pair based on data from the inertial sensor(s) of motion sensing unit 120 (e.g., by applying a double-integration on the signal(s) from the inertial sensor(s) and using a calibration data of the inertial sensor(s) thereof). The determined 3D distance may used as a virtual interferometric baseline.

For each of the pairs, direction of arrival determination module 134 may determine a first residual phase value based on the radio signal frequency and based radio signal 92 received by single antenna 110 at the first spatial position of the respective pair or receive the first residual phase value from homodyne receiver down converter 140 (e.g., as described hereinabove).

For each of the pairs, direction of arrival determination module 134 may determine a second residual phase value based the radio signal frequency and based on radio signal 92 received by single antenna 110 at the second spatial position of the respective pair or receive the second residual phase value from homodyne receiver down converter 140 (e.g., as described hereinabove).

For each of the pairs, direction of arrival determination module 134 may determine the direction of arrival of radio signal 92 based on the determined distance between the first spatial position and the second spatial position of the respective pair, the first residual phase value and the second residual phase value.

For example, the determined direction of arrival may be a spatial angle derived from the virtual interferometer based on a residual phase derived from the direct phase measurement in, e.g., a current single antenna position and, e.g., a phase estimation in a previous antenna position. One example of determining the direction of arrival of radio signal 92 by system 100 is described below with respect to FIG. 1C.

In some embodiments, direction of arrival determination module 134 may select the one or more pairs of the spatial positions such that the first spatial position and the second spatial position of each of the one or more pairs are subsequent spatial positions of the multiple spatial positions through which the single antenna has been moved. For example, a first selected pair of spatial positions may include an initial spatial position $SP_0$ and a first spatial position $SP_1$, a second selected pair of spatial positions may include the first spatial position $SP_1$ and the second spatial position $SP_2$, etc. In some embodiments, direction of arrival determination module 134 may select the one or more pairs of the spatial positions by randomly pairing the multiple spatial positions. Selecting the pairs of the spatial positions such that the spatial positions of each of the pairs are subsequent spatial positions of the multiple spatial positions may, for example, enable to accurately determine the distance between spatial positions of each of the pairs as, for example, at least some sensors of motion sensing unit 120 (e.g., inertial sensors) may provide accurate measurements for a relatively short time interval only.

In some embodiments, direction of arrival determination module 134 may determine a geolocation of radio emitter 90. In some embodiments, the geolocation of radio emitter 90 may be determined based on at least one of the one or more determined directions of arrival of radio signal 92 and based on a geolocation of at least one of the two or more spatial locations at which single antenna 110 has received radio signal 92. For example, the geolocation of at least one of the multiple spatial locations may be determined based on the motion data from motion sensing unit 120 (e.g., based on readings of geolocation sensor(s) 124). In some embodiments, direction of arrival determination module 134 may determine a geolocation of radio emitter 90 based on three or more determined directions of arrival of radio signal 92 (e.g., using triangulation techniques).

Direction of arrival determination module 134 may be capable of determined the direction of arrival of coherent radio signals and of modulated radio signals.

In some embodiments, controller 130 may include a radio signal demodulation module 136. For example, if radio signal 92 being emitted by radio emitter 90 is a modulated radio signal, radio signal demodulation module 136 may convert the modulated radio signal into to a demodulated coherent signal. In this case, direction of arrival determination module 134 may perform all the functions described hereinabove based on the demodulated coherent signal. One example of conversion of the modulated radio signal into to the demodulated coherent signal is described below with respect to FIG. 1D.

Figure 1C:
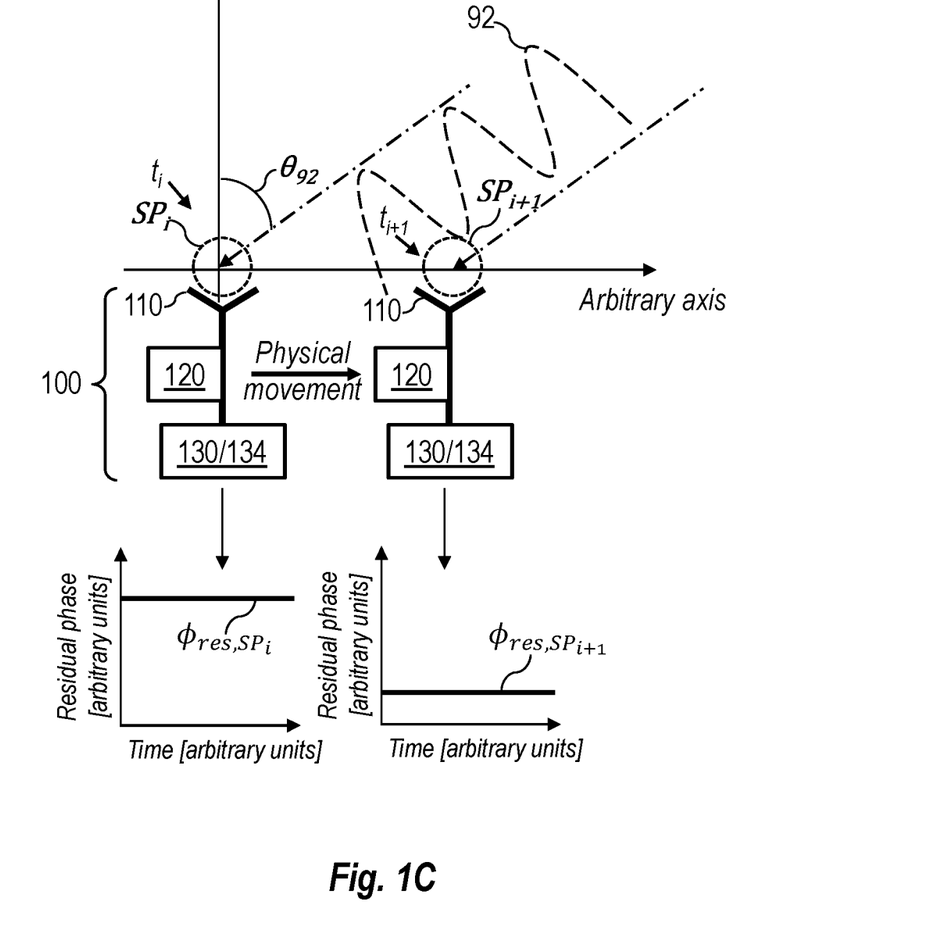
FIG. 1C which shows an example of determining the direction of arrival of a radio signal, according to some embodiments of the invention.

Reference is now made to FIG. 1C, which shows an example of determining the direction of arrival of a radio signal 92, according to some embodiments of the invention.

As schematically shown in FIG. 1C, at time $t_i$, single antenna 110 may be disposed at a spatial position $SP_i$ and may receive radio signal 92. Direction of arrival determination module 134 may determine a residual phase value $\phi_{res,SPi}$ based on radio signal 92 received at the spatial position $SP_i$ and based on the radio signal frequency (e.g., as described hereinabove).

At time $t_{i+1}$, single antenna 110 may be physically moved to a spatial position $SP_{i+1}$ and may receive radio signal 92. Direction of arrival determination module 134 may determine a residual phase value $\phi_{res,SP_{i+1}}$ based on radio signal 92 received at the spatial position $SP_{i+1}$ and based on the radio signal frequency (e.g., as described hereinabove). Direction of arrival determination module 134 may determine a distance $D_{SP_i/SP_{i+1}}$ between the spatial position $SP_i$ and $SP_{i+1}$ based on the motion data (e.g., from motion sensing unit 120 as described hereinabove).

Direction of arrival determination module 134 may determine the direction of arrival $\theta_{92}$ of radio signal 92 based on the determined residual phase values $\phi_{res,SPi}$, $\phi_{res,SP_{i+1}}$ and the determined distance $D_{SP_i/SP_{i+1}}$ between the spatial position $SP_i$ and $SP_{i+1}$. For example, the direction of arrival $\theta_{92}$ of radio signal 92 may be provided by Equation 3:

$$\theta_{92} = \sin^{-1}\frac{\lambda_{92}(\phi_{res,SP_{i+1}} - \phi_{res,SP_i})}{2\pi D_{SP_i/SP_{i+1}}} \quad \text{(Equation 3)}$$

wherein $\lambda_{92}$ is a wavelength of radio signal 92 which is function of the radio signal frequency.

Equation 3 has a single solution as long as the distance $D_{SP_i/SP_{i+1}}$ between the spatial position $SP_i$ and $SP_{i+1}$ is smaller or equal to half of the wavelength $\lambda_{92}$ of radio signal 92. If the distance $D_{SP_i/SP_{i+1}}$ between the spatial position $SP_i$ and $SP_{i+1}$ is larger than half of the wavelength $\lambda_{92}$ of radio signal 92, there may be an ambiguity in determining the direction of arrival $\theta_{92}$ of radio signal 92. This ambiguity may be since the number of repetitions of the wavelength $\lambda_{92}$ of radio signal 92 within the distance $D_{SP_i/SP_{i+1}}$ between the spatial position $SP_i$ and $SP_{i+1}$ may be greater than one.

In some embodiments, direction of arrival determination module 134 may determine one or more sets of possible directions of arrival of radio signal 92. Each of the one or more sets of the possible directions of arrival of radio signal 92 may be determined for a pair of the one or more selected pairs of spatial positions for which the distance between the first spatial position and the second spatial position of the respective pair is greater than half of the wavelength of radio signal 92.

Direction of arrival determination module 134 may determine a most probable direction of arrival of the radio signal based on the sets of possible directions of arrival thereof and based on one of: a largest number of occurrences of each of the possible directions of arrival in the one or more sets and a number of occurrences of each of the possible directions of arrival in the one or more sets that exceeds a predetermined threshold.

In some embodiments, the sampling rate of motion sensing unit 120 may be set to ensure that a distance between the multiple spatial positions at which radio signal 92 is being received is small enough (e.g., smaller or equal to half of the wavelength $\lambda_{92}$ of radio signal 92) to eliminate the ambiguity thereof.

Figure 1D:
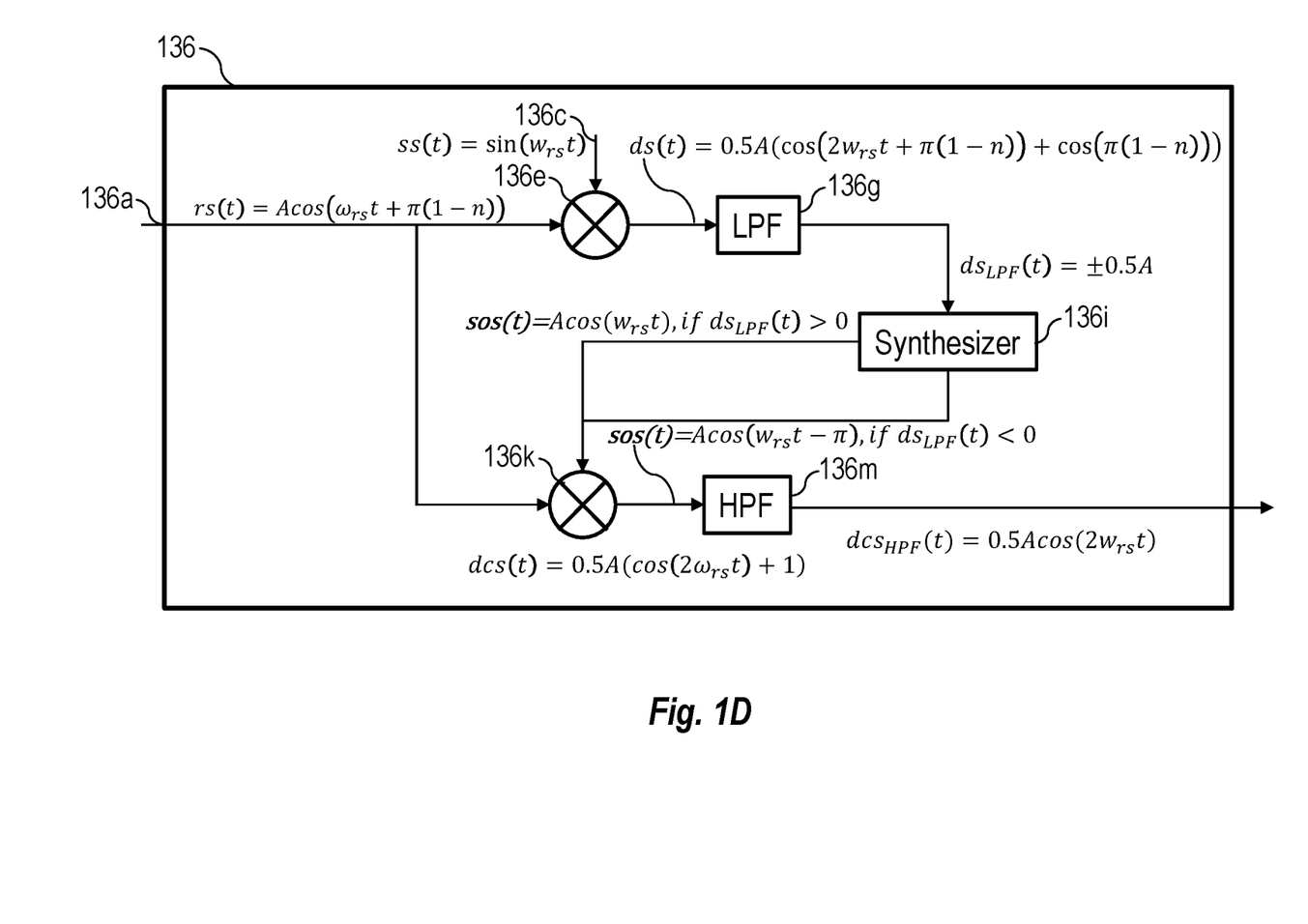
FIG. 1D is a flowchart of functions performed by a radio signal demodulation module to convert a modulated radio signal into a demodulated coherent signal, according to some embodiments of the invention.

Reference is now made to FIG. 1D, which is a flowchart of functions performed by a radio signal demodulation module 136 to convert a modulated radio signal into a demodulated coherent signal, according to some embodiments of the invention.

At 136a, radio signal demodulation module 136 may receive a modulated radio signal rs(t). For example, the modulated radio signal rs(t) may be provided by Equation 4:

$$rs(t) = A\cos(w_{rs}t + \pi(1-n)) \quad \text{(Equation 4)}$$

wherein A is an amplitude of the modulated radio signal, $\omega_{rs}$ is the radio signal frequency and n may be equal to 0 or 1.

At 136c, radio signal demodulation module 136 may generate a synthetic signal ss(t) having the radio signal frequency $\omega_{rs}$. For example, the synthetic signal ss(t) may be provided by Equation 5:

$$ss(t) = \sin(w_{rs}t) \quad \text{(Equation 5)}$$

At 136e, radio signal demodulation module 136 may multiply the modulated radio signal rs(t) by the synthetic signal ss(t) to provide a demodulated signal ds(t). For example, the demodulated signal ds(t) may be provided by Equation 6:

$$ds(t) = rs(t) \cdot ss(t) = 0.5A(\cos(2w_{rs}t + \pi(1-n)) + \cos(\pi(1-n))) \quad \text{(Equation 6)}$$

At 136g, radio signal demodulation module 136 may pass the demodulated signal ds(t) through a low pass filter to provide a demodulated low pass filter output signal $ds_{LPF}(t)$. For example, the demodulated low pass filter output signal $ds_{LPF}(t)$ may be provided by Equation 7:

$$ds_{LPF}(t) = \pm 0.5\,A \quad \text{(Equation 7)}$$

At 136i, radio signal demodulation module 136 may pass the demodulated low pass filter output signal $ds_{LPF}(t)$ through a synthesizer that may be configured to determine an added phase value $\phi_{added}$ and provide a synthesizer output signal sos(t). For example, the added phase value $\phi_{added}$ may be provided by Equation 8 and the synthesizer output signal sos(t) may be provided by Equation 9:

$$\phi_{added}\begin{cases} 0, & \text{if } ds_{LPF}(t) > 0 \\ -\pi, & \text{if } ds_{LPF}(t) < 0 \end{cases} \quad \text{(Equation 8)}$$

$$sos(t) = \begin{cases} A\cos(w_{rs}t), & \text{if } ds_{LPF}(t) > 0 \\ A\cos(w_{rs}t - \pi), & \text{if } ds_{LPF}(t) < 0 \end{cases} \quad \text{(Equation 9)}$$

At 136k, radio signal demodulation module 136 may multiply the synthesizer output signal sos(t) by the modulated radio signal rs(t) to provide a demodulated coherent signal dcs(t). For example, the demodulated coherent signal dcs(t) may be provided by Equation 10:

$$dcs(t) = rs(t) \cdot sos(t) = 0.5\,A(\cos(2\omega_{rs}t) + 1) \quad \text{(Equation 10)}$$

At 136m, radio signal demodulation module 136 may pass the demodulated coherent signal dcs(t) through a high pass filter to provide a demodulated coherent high pass filter output signal $dcs_{HPF}(t)$. For example, the demodulated coherent high pass filter output signal $dcs_{HPF}(t)$ may be provided by Equation 11:

$$dcs_{HPF}(t) = 0.5\,A\cos(2w_{rs}t) \quad \text{(Equation 11)}$$

The demodulated coherent high pass filter output signal $dcs_{HPF}(t)$ is a coherent signal having double the radio signal frequency $w_{rs}$, for which the residual phase value may be determined (e.g., as described hereinabove). In some embodiments, direction of arrival determination module 134 may perform all the functions described hereinabove based on the demodulated coherent high pass filter output signal $dcs_{HPF}(t)$.

In some embodiments, radio signal demodulation module 136 may pass the received modulated radio signal through a finite impulse response (FIR) filter to determine a residual phase value of the received modulated radio signal. For example, if the repetitive data and modulated radio signal waveform parameters are known, radio signal demodulation module 136 may recover one or more samples of the repetitive data thereof and determine coefficients of the FIR filter based on the recovered one or more samples.

Figure 1E:
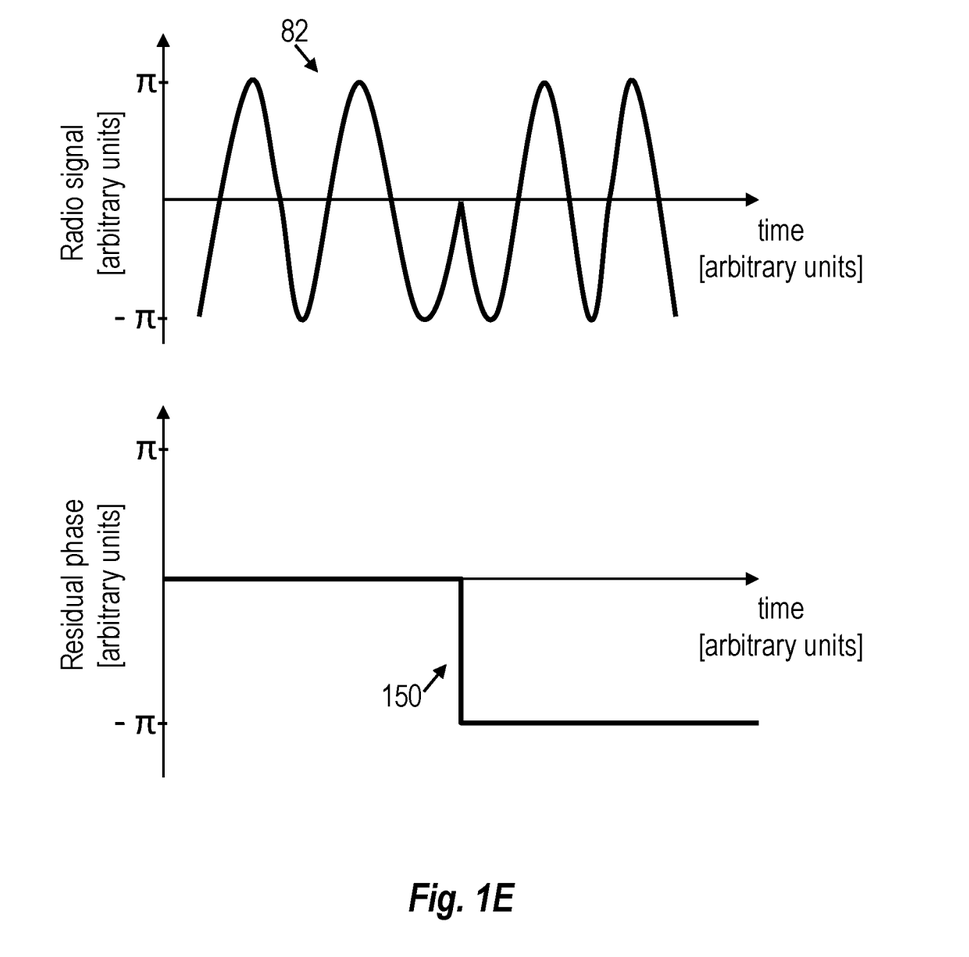
FIG. 1E depicts one example of a modulated radio signal and a residual phase determined based on the received modulated radio signal, according to some embodiments of the invention.

FIG. 1E depicts one example of a modulated radio signal 82 and a residual phase 150 determined based on the received modulated radio signal 82, according to some embodiments of the invention.

Figure 1F:
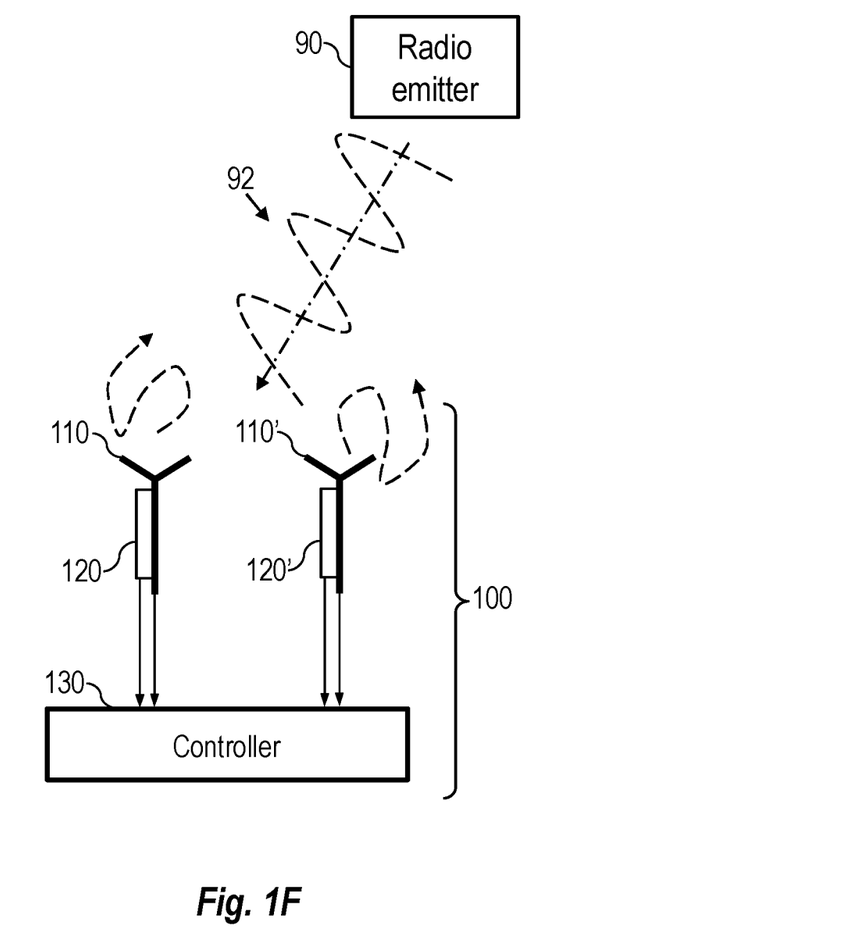
FIG. 1F, which is a schematic block diagram of a system for determining a direction of arrival of a radio signal being emitted by a radio emitter and/or a geolocation of radio emitter, including two or more antennas, according to some embodiments of the invention.

Reference is now made to FIG. 1F, which is a schematic block diagram of a system 100 for determining a direction of arrival of a radio signal 92 being emitted by a radio emitter 90 and/or a geolocation of radio emitter 90, including two or more antennas, according to some embodiments of the invention.

According to some embodiments, system 100 may include two or more antennas. For example, in embodiments shown in FIG. 1F, system 100 may include a first antenna 110 and a second antenna 110'. Each of first antenna 110 and second antenna 110' may be movable independent from each other. For example, first antenna 110 may be movable through a first set of multiple spatial positions and second antenna 110' may be movable through a second set of multiple spatial positions. First antenna 110' may receive radio signal 92 being emitted by radio emitter 90 at two or more of the multiple spatial positions of the first set. Second antenna 110' may receive radio signal 92 being emitted by radio emitter 90 at two or more of the multiple spatial positions of the second set. Controller 130 may determine one or more directions of arrival of radio 92 signal based on radio signal 92 being received by first antenna 110 and second antenna 110' (e.g., as described above with respect to FIGS. 1A, 1B, 1C and 1D). In some embodiments, system 100 may include a first motion sensing unit 120 attached to first antenna 110 and a second motion sensing unit 120' attached to second antenna 110' for generating motion data indicative of the movement of the first antenna and the second antenna, respectively. Each of first motion sensing unit 120 and second motion sensing unit 120' may be similar to motion sensing unit 120 described above with respect to FIGS. 1A, 1B and 1C.

Figure 2:
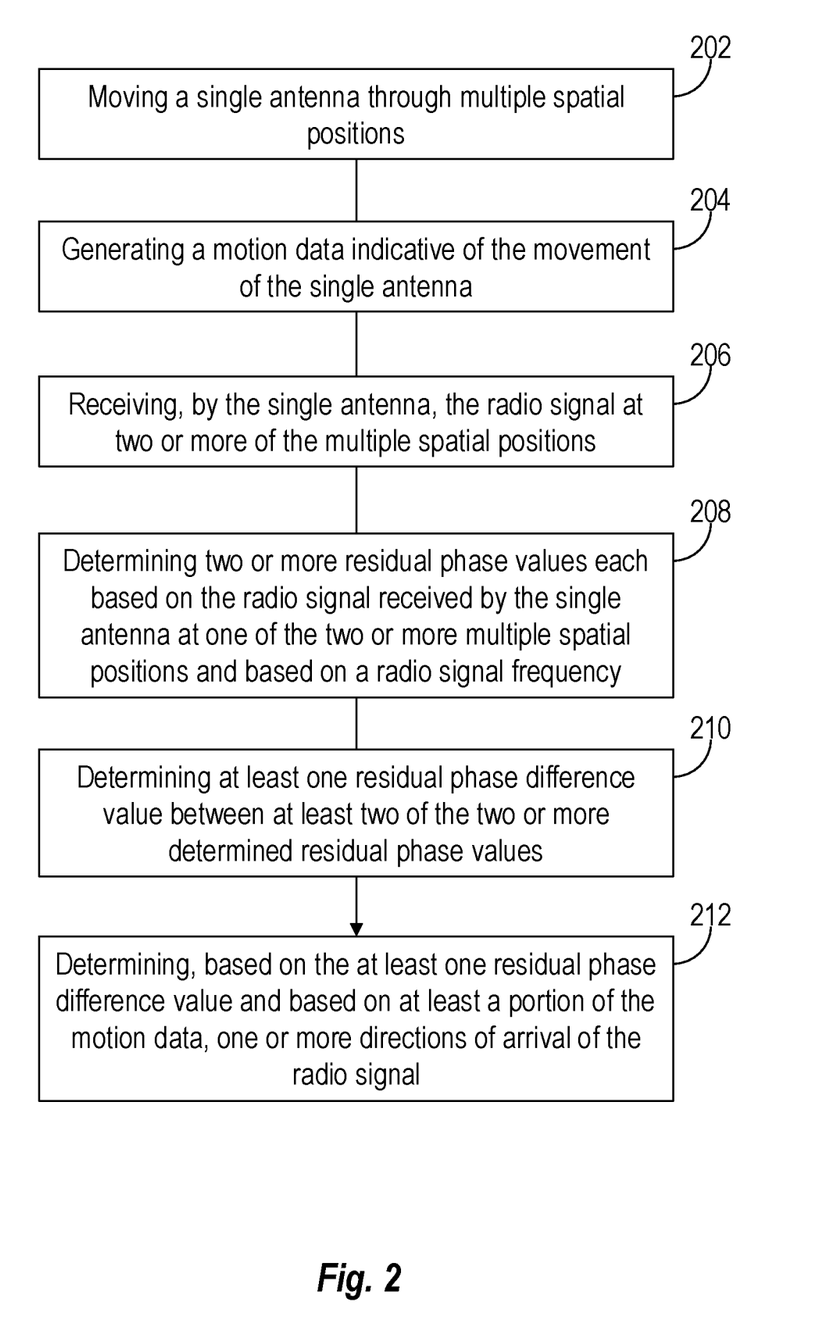
FIG. 2 is a flowchart of a method of determining the direction of arrival of a radio signal being emitted by a radio emitter and/or a geolocation of the radio emitter, according to some embodiments of the invention.

Reference is now made to FIG. 2, which is a flowchart of a method of determining a direction of arrival of a radio signal being emitted by a radio emitter and/or a geolocation of the radio emitter, according to some embodiments of the invention.

The method may be implemented by system 100, which may be configured to implement the method.

The method may include moving 202 a single antenna through multiple spatial positions. For example, the single antenna may be single antenna 110 described hereinabove.

Some embodiments may include holding the single antenna and manually moving the single antenna through multiple spatial positions. For example, the user may shake the single antenna to move the single antenna through the multiple spatial positions. Some embodiments may include installing the single antenna on a platform configured to move the single antenna. For example, the platform may be a drone.

Some embodiments may include moving the single antenna through multiple arbitrary spatial positions. For example, the user may hold the single antenna and randomly move/shake the single antenna while directing the single antenna towards a region of interest. Some embodiments may include moving the single antenna in a predefined manner such that the multiple spatial positions are disposed along a predefined virtual route (e.g., circular route).

The method may include generating 204 motion data indicative of the movement of the single antenna.

Some embodiments may include generating the motion data by a motion sensing unit connected to the single antenna. The motion sensing unit may be similar to motion sensing unit 120 described hereinabove. In some embodiments, the motion sensing unit may include one or more inertial sensors. In some embodiments, the motion sensing unit may include one or more accelerometers (e.g., three-axis accelerometers). In some embodiments, the motion sensing unit may include one or more gyros (e.g., three-axis gyros). In some embodiments, the motion sensing unit may include one or more compasses. In some embodiments, the motion sensing unit may include one or more geolocation sensors. In some embodiments, the motion sensing unit may include one or more optical sensors.

Some embodiments may include determining a radio signal frequency of the radio signal being emitted by the radio emitter. Some embodiments may include detecting that the single antenna is stationary (or substantially stationary) and determining the radio signal frequency based on the radio signal received by the stationary single antenna.

Some embodiments may include determining that the single antenna is stationary based on two or more image frames (e.g., containing images of a surrounding environment) obtained by the optical sensor(s) of the motion sensing unit connected to the single antenna (e.g., as described above with respect to FIGS. 1A and 1B). For example, some embodiments may include comparing at least some of the two or more image frames and determining that the single antenna is stationary (or substantially stationary) if a difference between at least a portion subsequent image frames of the two or more image frames is below a specified threshold.

Some embodiments may include calibrating at least some components of the motion sensing unit (e.g., inertial sensor(s), accelerometer(s), gyro(s), etc.) when the single antenna and the motion sensing unit attached thereto are stationary (or substantially stationary).

Some embodiments may include generating at least a portion of the motion data based on readings of a tracking unit that is not connected to the single antenna (e.g., as described above with respect to FIGS. 1A and 1B).

The method may include receiving 206, by the single antenna, the radio signal at two or more of the multiple spatial positions. For example, as described hereinabove with respect to FIGS. 1A, 1B and 1C.

The method may include determining 208 two or more residual phase values, each based on the radio signal received by the single antenna at one of the two or more multiple spatial positions and based on a radio signal frequency. For example, as described hereinabove with respect to FIGS. 1A, 1B and 1C.

The method may include determining 210 at least one residual phase difference value between at least two of the two or more determined residual phase values.

The method may include determining 212, based on the at least one residual phase difference value and based on at least a portion of the motion data, one or more directions of arrival of the radio signal. For example, as described hereinabove with respect to FIGS. 1A, 1B and 1C.

Some embodiments may include selecting one or more pairs of spatial positions of the two or more spatial position at which the single antenna has received the radio signal, each of the one or more pairs having a first spatial position and a second spatial position.

Some embodiments may include determining, for each of the pairs, a distance between the first spatial position and the second spatial position of the respective pair based on the motion data. For example, as described above with respect to FIGS. 1A, 1B and 1C.

Some embodiments may include determining, for each of the pairs, a first residual phase value based on the radio signal frequency and based on the radio signal received by the single antenna at the first spatial position of the respective pair. For example, as described above with respect to FIGS. 1A, 1B and 1C.

Some embodiments may include determining, for each of the pairs, a second residual phase value based on the radio signal frequency and based on the radio signal received by the single antenna at the second spatial position of the respective pair. For example, as described above with respect to FIGS. 1A, 1B and 1C.

Some embodiments may include determining, for each of the pairs, the direction of arrival of the radio signal based on the determined distance between the first spatial position and the second spatial position, the first residual phase value and the second residual phase value. For example, as described above with respect to FIGS. 1A, 1B and 1C.

Some embodiments may include selecting the one or more pairs of the spatial positions such that the first spatial position and the second spatial position of each of the one or more pairs are subsequent spatial positions of the multiple spatial positions through which the single antenna has been moved. For example, as described hereinabove with respect to FIG. 1A.

Some embodiments may include determining a geolocation of the radio emitter. Some embodiments may include determining the geolocation of the radio emitter based on at least one of the determined one or more directions of arrival of the radio signal and based on a geolocation of at least one of the two or more spatial locations at which the single antenna has received the radio signal. Some embodiments may include determining the geolocation of the radio emitter based on three or more directions of arrival of the radio signal.

Some embodiments may include determining one or more sets of possible directions of arrival of the radio signal, each for a pair of the one or more selected pairs of spatial positions for which the distance between the first spatial position and the second spatial position of the respective pair is greater than half of the wavelength of the radio signal. For example, as described hereinabove with respect to FIG. 1C.

Some embodiments may include determining a most probable direction of arrival of the radio signal based on the one or more sets of possible directions of arrival thereof and based on one of: a largest number of occurrences of each of the possible directions of arrival in the one or more sets and a number of occurrences of each of the possible directions of arrival in the one or more sets that exceeds a predetermined threshold. For example, as described hereinabove with respect to FIG. 1C.

Some embodiments may include setting the sampling rate of the motion sensing unit to ensure that a distance between the multiple spatial positions at which the radio signal is being received by the single antenna is small enough (e.g., smaller or equal to half of the wavelength of the radio signal) to eliminate the ambiguity thereof.

Some embodiments may include converting a modulated radio signal received by the single antenna to a demodulated coherent signal and determining the two or more residual phase values and the direction of arrival of the radio signal based on the demodulated coherent signal. For example, as described hereinabove with respect to FIGS. 1A and 1D.

Some embodiments may include generating a synthetic signal having the radio signal frequency. For example, as described hereinabove with respect to FIG. 1D.

Some embodiments may include multiplying the modulated radio signal by the synthetic signal to provide a demodulated signal. For example, as described hereinabove with respect to FIG. 1D.

Some embodiments may include passing the demodulated signal through a low pass filter to provide a demodulated low pass filter output signal. For example, as described hereinabove with respect to FIG. 1D.

Some embodiments may include passing the demodulated low pass filter output signal through a synthesizer to determine an added phase value and to provide a synthesizer output signal based on the added phase value and the demodulated low pass filter output signal. For example, as described hereinabove with respect to FIG. 1D.

Some embodiments may include multiplying the synthesizer output signal by the modulated radio signal to provide a demodulated coherent signal. For example, as described hereinabove with respect to FIG. 1D.

Some embodiments may include passing the demodulated coherent signal through a high pass filter to provide a demodulated coherent high pass filter output signal. For example, as described hereinabove with respect to FIG. 1D.

Some embodiments may include determining the two or more residual phase values and the direction of arrival of the radio signal based on the demodulated coherent high pass filter output signal. For example, as described hereinabove with respect to FIG. 1D.

Some embodiments may include passing a modulated radio signal received by the single antenna through a finite impulse response (FIR) filter to determine a residual phase value of the received modulated radio signal. Some embodiments may include determining coefficients of the FIR filer based on samples recovered from known repetitive data and waveform parameters of the received modulated radio signal.

Some embodiments may include moving a first antenna through a first set of multiple spatial positions and receiving, by the first antenna, the radio signal at two or more of the multiple spatial positions of the first set. Some embodiments may include moving a second antenna through a second set of multiple spatial positions and receiving, by the second antenna, the radio signal at two or more of the multiple spatial positions of the second set. Some embodiments may include determining the one or more directions of arrival of the radio signal based on the radio signal being received by the first antenna and the second antenna.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods, and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of determining a direction of arrival of a radio signal being emitted by a radio emitter, the method comprising:
   moving a single antenna through multiple spatial positions;
   generating a motion data indicative of the movement of the single antenna;
   receiving, by the single antenna, the radio signal at two or more of the multiple spatial positions;
   determining two or more residual phase values, each based on the radio signal received by the single antenna at one of the two or more spatial positions and based on a radio signal frequency;
   determining at least one residual phase difference value between at least two of the two or more determined residual phase values; and
   determining, based on the at least one residual phase difference value and at least a portion of the motion data, one or more directions of arrival of the radio signal.

2. The method of claim 1, comprising determining a geolocation of the radio emitter based on one of:
   at least one of the one or more determined directions of arrival of the radio signal and a geolocation of at least one of the two or more spatial positions; and
   three or more determined directions of arrival of the radio signal.

3. The method of claim 1, comprising generating the motion data using a motion sensing unit connected to the single antenna, the motion sensing unit comprises at least one of: one or more inertial sensors, one or more accelerometers, one or more gyros, one or more compasses, one or more geolocation sensors and one or more optical sensors.

4. The method of claim 3, comprising detecting that the single antenna is stationary based on two or more image frames obtained by the one or more optical sensors of the motion sensing unit; and further comprising at least one of:
   determining the radio signal frequency based on the radio signal received by the stationary single antenna; and
   calibrating at least one component of the motion sensing unit when the single antenna and the motion sensing unit connected thereto are stationary.

5. The method of claim 1, wherein the radio signal is a modulated radio signal and the method comprising:
   converting the modulated radio signal received by the single antenna to a demodulated coherent signal; and determining the two or more residual phase based on the demodulated coherent signal.

6. The method of claim 5, wherein the converting comprising:
generating a synthetic signal having the radio signal frequency;
determining an added phase value based on the modulated radio signal and the synthetic signal; and
determining the coherent demodulated signal based on the modulated radio signal, the synthetic signal and the added phase value.

7. The method of claim 1, wherein the radio signal is a modulated radio signal and the method comprising passing the modulated radio signal received by the single antenna through a finite impulse response (FIR) filter to determine a residual phase value of the received modulated radio signal.

8. The method of claim 7, comprising determining coefficients of the FIR filter based on samples recovered from known repetitive data and waveform parameters of the received modulated radio signal.

9. The method of claim 1, comprising:
selecting one or more pairs of spatial positions of the two or more spatial positions at which the single antenna has received the radio signal, each of the one or more pairs has a first spatial position and a second spatial position;
for each of the one or more pairs:
determining, based on the motion data, a distance between the first spatial position and the second spatial position of the respective pair;
determining a first residual phase value based on the radio signal frequency and based on the radio signal received by the single antenna at the first spatial position of the respective pair;
determining a second residual phase value based the radio signal frequency and based on the radio signal received by the single antenna at the second spatial position of the respective pair; and
determining the direction of arrival of the radio signal based on the determined distance between the first spatial position and the second spatial position, the first residual phase value and the second residual phase value.

10. The method of claim 9, comprising selecting the one or more pairs such that the first spatial position and the second spatial position of each of the one or more pairs are subsequent spatial positions of the multiple spatial position through which the single antenna has been moved.

11. The method of claim 9, comprising determining one or more sets of possible directions of arrival of the radio signal, each of the one or more sets is for a pair of the one or more selected pairs of spatial positions for which the distance between the first spatial position and the second spatial position of the respective pair is greater than half of a wavelength of the radio signal.

12. The method of claim 11, comprising determining a most probable direction of arrival of the radio signal based on the sets of possible directions of arrival thereof and based on one of:
a largest number of occurrences of each of the possible directions of arrival in the one or more sets; and
a number of occurrences of each of the possible directions of arrival in the one or more sets that exceeds a predetermined threshold.

13. The method of claim 1, comprising:
moving a first antenna through a first set of multiple spatial positions and receiving, by the first antenna, the radio signal at two or more of the multiple spatial positions of the first set;
moving a second antenna through a second set of multiple spatial positions and receiving, by the second antenna, the radio signal at two or more of the multiple spatial positions of the second set;
determining the one or more directions of arrival of the radio signal based on the radio signal being received by the first antenna and the second antenna.

14. A system for determining a direction of arrival of a radio signal being emitted by a radio emitter, the system comprising:
a single antenna configured to be moved through multiple spatial positions and configured to receive the radio signal at two or more of the multiple spatial positions; and
a controller configured to determine one or more directions of arrival of the radio signal based on:
a radio signal frequency;
at least one residual phase difference value between at least two of two or more residual phase values each obtained based on the radio signal received by the single antenna at one of the two or more multiple spatial positions; and
at least a portion of a motion data indicative of the movement of the single antenna.

15. The system of claim 14, wherein the controller is configured to determine the two or more residual phase values.

16. The system of claim 14, comprising a homodyne receiver down converter configured to determine the two or more residual phase values and to provide the two or more residual phase values to the controller.

17. The system of claim 14, wherein the controller is configured to determine a geolocation of the radio emitter based on one of:
at least one of the one or more determined directions of arrival of the radio signal and a geolocation of at least one of the two or more spatial positions; and
three or more determined directions of arrival of the radio signal.

18. The system of claim 14, comprising a motion sensing unit connected to the single antenna, the motion sensing unit comprises at least one of: one or more inertial sensors, one or more accelerometers, one or more gyros, one or more compasses, one or more geolocation sensors and one or more optical sensors.

19. The system of claim 18, wherein the controller is configured to detect that the single antenna is stationary based on two or more image frames obtained by the one or more optical sensors of the motion sensing unit; and is further configured to at least one of:
determine the radio signal frequency based on the radio signal received by the stationary single antenna; and
calibrate at least one component of the motion sensing unit when the single antenna and the motion sensing unit connected thereto are stationary.

20. The system of claim 14, wherein the radio signal is a modulated radio signal, and the controller is configured to:
convert the modulated radio signal received by the single antenna to a demodulated coherent signal; and
determine the two or more residual phase values and the direction of arrival of the radio signal based on the demodulated coherent signal.

* * * * *